UNITED STATES PATENT OFFICE.

EWALD RASCH, OF NUREMBERG, GERMANY.

PROCESS OF PRODUCING ELECTRIC-ARC LIGHTS.

SPECIFICATION forming part of Letters Patent No. 663,467, dated December 11, 1900.

Application filed May 7, 1900. Serial No. 15,790. (No specimens.)

*To all whom it may concern:*

Be it known that I, EWALD RASCH, a subject of the Emperor of Germany, residing at Nuremberg, in the Kingdom of Bavaria, Empire of Germany, have invented a new and useful Process of Producing Electric-Arc Lights, of which the following is a full, clear, and exact description.

The proper use of heat-proof solid electrolytes traversed by a current for the production of electric incandescent light according to Prof. Dr. Walther Nernst results, as will be known, in a rational emission of light. This high efficiency is based on the fact that the oxids of the rare earth metals used mostly as incandescence bodies form the best-known heat-resisting substances and can therefore bear relatively very high incandescence temperatures. The result of this is a displacement of the radiation maximum of the energy curve, so that according to the Wien displacement law—

$$\lambda \text{ max.} = \frac{C'}{T}$$

and $$E \text{ max.} = C_2 \cdot T^5$$

with increasing temperature of the radiator the most light active parts of the green-blue in the spectrum become more and more active as compared with those of the invisible red. On the other hand, however, the maximum radiation intensity E max. also increases rapidly as the fifth power of the absolute temperature T. The constant $C_2$ amounts in this case for the black body to about 53.10° Fahrenheit according to later experiments. Even if the possibility of an anomalous selective radiation be admitted the requirement nevertheless consists in causing an illuminating body to radiate at the highest possible temperature. Without doubt the Nernst incandescent light complies with this requirement to a certain extent, so that when normally marked at 1.5 watts a double efficiency of ten per cent. in the light emission may be expected as compared with carbon incandescent light. If, however, the Nernst incandescence body is marked still higher, so that the consumption of current falls to one watt per candle, the oxid body becomes soft, crumbles away, fuses, and has only a short life.

Now the subject-matter of this invention is an electrolyte light in which the effective incandescence temperatures of the illuminating elements are raised to the crumbling temperatures of the solid electrolyte.

Experiments have shown that an independent permanent arc can be drawn out between two electrolyte incandescent rods composed of oxids of metals, mixtures of oxids of metals, or the like if the incandescent rods are conductors or are brought to their arc-striking temperatures. Between fixed electrolyte electrodes a permanent arc can likewise be caused by passing spark-discharges. The temperature at the points of the electrodes is of course considerably higher than in an oxid incandescent light. The consumption of current per normal candle is therefore considerably less in an electrolyte arc-light. Measured in advance of the lamp it amounts to about 0.25 watt per candle.

Since the consumption of the electrolyte electrodes is very slight, the simplest possible mechanisms may be advantageously used to effect the alteration of the positions of the electrodes, which mechanisms act under the influence of the heat (radiant, conducted, or Joule's heat) with the aid of compensating springs or the like. The operating apparatus can of course be actuated electromagnetically.

The preliminary heating of the electrodes, which is necessary for striking the arc, may be external or internal. In some cases external sources of heat are used, which act independently of or dependently on the lamp, (electric heating resistances, spirit-flames, or the like.) In other cases the electrodes are preliminarily incited or heated by passing a high-tension current therethrough or thereover. These electrodes although non-conductors are very feebly conductive at ordinary temperatures under the stress of a high-tension current and are to be clearly distinguished from electrodes consisting of mixtures of oxids and good conductors, which electrodes have the ordinary properties of carbon-pencils.

Now in order to prevent the passage of the current through the entire length of the incandescent oxid rods and the loss caused thereby the actual parts that form the arc—

*i. e.*, the fireproof metallic oxid electrodes—are provided with jackets, cores, or interiors of a better conducting material, such as carbon, metals, metallic compounds, or the like. These current-conductors conduct the current temporarily almost to the ends of the electrodes, so that the ends of the oxid electrodes lying toward the clamps cannot be traversed by current at all. In the vicinity of the incandescent electrode-points, however, the good conducting layers of the first-class conductors soon burn away, so that the second-class conductors are always denuded of the first-class conductors for a certain distance.

An especial advantage of these electrolyte arc-lamps apart from the great economy consists in the easy divisibility of the light and the possibility of making arc-lamps of small candle-power. Of course according to this invention an arc can be maintained between a conductor of the second class on one hand and a conductor of the first class on the other hand.

By "conductors of the second class" or "electrolytes" is meant non-metallic substances which conduct the electric current better when heated than when cold.

I claim—

1. The process of producing light, which consists in bringing electrodes into arcing juxtaposition with each other, one (at least) of said electrodes being of a material which is a non-conductor when cold and a conductor when heated, heating the said electrode to render it conductive, producing an arc between the said electrodes and maintaining the said arc by the passage of a current of such intensity as to sustain the point of the second-class-conductor electrode at such a temperature as to be luminous.

2. The process of producing light, which consists in bringing electrodes into arcing juxtaposition, one (at least) of the said electrodes being composed of a length of a good conductor and a mass of electrolyte or second-class conductor non-conducting when cold and conductive when heated, passing current through the good conductor of such intensity as to maintain an arc and melt off the good conductor in the neighborhood of the arc, thereby heating the second-class conductor in the neighborhood of the arc to a conducting temperature, and thereupon maintaining the arc between the said second-class conductor and the other electrode, and maintaining the current at such intensity as to sustain arcing portion of the said second-class conductor at a luminous temperature.

3. The method of producing light, which consists in bringing electrodes into arcing juxtaposition, one (at least) of said electrodes being of a material which is non-conducting when cold and conductive when heated, passing a current through the arcing point of such intensity as to heat the second-class conductor to conducting temperature, and thereafter maintaining through the arc a current of less intensity sufficient to sustain the arc.

4. The method of producing light by the passage of an electric current between electrodes of material non-conducting at ordinary temperatures, but becoming conductive at high temperatures, which consists in heating the electrodes to conductivity before the passage of the arc maintaining current, and, while the electrodes are heated, forming and maintaining an arc between the electrodes by the passage of such a current as will maintain the arc.

5. The method of producing light, which consists in bringing into arcing proximity electrodes which are conductive when heated and non-conductive when cold, heating the electrodes to conducting temperature by external heating means, and establishing and maintaining the arc by the flow of an electric current between the electrodes.

In witness whereof I have hereunto signed my name, this 24th day of April, 1900, in the presence of two subscribing witnesses.

EWALD RASCH.

Witnesses:
 WOLDEMAR HAUPT,
 HENRY HASPER.